United States Patent [19]

Ingram et al.

[11] 4,380,277
[45] Apr. 19, 1983

[54] AUTOMATIC SLACK ADJUSTERS FOR VEHICLE SHOE-DRUM BRAKES

[75] Inventors: Brian Ingram, Warwickshire; David A. Harries; Michael J. England, both of West Midlands,, England

[73] Assignee: Lucas Industries Limited, Birmingham, England

[21] Appl. No.: 195,428

[22] Filed: Oct. 9, 1980

[30] Foreign Application Priority Data

Oct. 10, 1979 [GB] United Kingdom ................ 7935130
Dec. 13, 1979 [GB] United Kingdom ................ 7943037

[51] Int. Cl.³ ............................................. F16D 51/00
[52] U.S. Cl. ............................. 188/329; 188/196 BA
[58] Field of Search ............. 188/79.5 GC, 79.5 GT, 188/79.5 K, 79.5 R, 79.5 P, 329, 330, 332, 188/196 BA, 196B, 71.9, 72.8, 343; 192/111

[56] References Cited

U.S. PATENT DOCUMENTS 3,346,077 10/1967 Cumming ............................ 188/343
3,805,926 4/1974 Clay et al. ................ 188/196 BA X
3,891,068 6/1975 Camph ......................... 188/196 BA

FOREIGN PATENT DOCUMENTS 169869 12/1951 Australia ............................ 188/330
1288463 1/1969 Fed. Rep. of Germany ...... 188/196 BA
1431023 4/1976 United Kingdom .

Primary Examiner—Douglas C. Butler
Attorney, Agent, or Firm—Scrivener, Clarke, Scrivener and Johnson

[57] ABSTRACT

An automatic slack adjuster comprises a pair of thrust assemblies. Each thrust assembly acts between a cam and a respective shoe-end and is guided to slide axially in a bore in a housing. Each thrust assembly comprises a nut which engages with, and is held against rotation with respect to, a respective shoe-end, and a screw-threaded tappet having a piston part which slides in the bore, and an integral threaded stem of reduced diameter which is screwed through the nut. The piston parts are both provided with gear teeth to enable them to be rotated together by the engagement of a crown wheel, or a pair of pinions carried by opposite ends of a transverse shaft which is rotatable in a bore normal to a bore in which the cam shaft carrying the cam is rotatable.

8 Claims, 10 Drawing Figures

AUTOMATIC SLACK ADJUSTERS FOR VEHICLE SHOE-DRUM BRAKES

SPECIFIC DESCRIPTION

This invention relates to an automatic slack adjuster for a vehicle shoe-drum brake of the type comprising brake shoes carrying friction linings for engagement with a rotatable drum, and an actuating cam carried by a cam shaft which is rotatable about a fixed axis to enable the cam to separate adjacent shoe ends, the slack adjuster being of the kind comprising a pair of thrust assemblies, each adapted to act between the cam and a respective shoe-end and each comprising first and second interengaged screw-threaded members which are relatively rotatable to increase the effective length of the thrust assembly to compensate for wear of the friction lining of the respective shoe, each first member being adapted to be held against rotation with respect to its respective shoe-end, and each second member being provided with gear teeth, a drive mechanism meshing with the gear teeth so that both second members are adapted to rotate together whereby the effective lengths of both assemblies are increased by equivalent amounts, and means for rotating at least one of the second members when adjustment to compensate for wear is required.

One known automatic slack adjuster of the kind set forth is disclosed in G.B. Pat. No. 1,431,023 and corresponding U.S. Pat. No. 3,891,068. In this known construction each thrust assembly has a direct rocking engagement at opposite ends with the cam and the respective shoe-end so that the whole of each thrust assembly is moved angularly as the first and second members are relatively rotated.

In such a known automatic slack adjuster difficulties may be experienced in constructing the assemblies of sufficient strength to withstand the brake applying and adjustment forces without failure of the screw-threads, the tendency for the thrust assemblies to bend, and the generation of friction forces of a magnitude sufficient to impede rotation of the second members relative to the first. Also angular movement of the thrust assemblies complicates the means for rotating the said one second member, and such angular movement sets up considerable inertia forces which have to be absorbed by the cam and the shoe-ends with an inherent tendency for vibrations to be set-up. In addition it is difficult to seal the first and second members of each thrust assembly against the ingress of dirt or other foreign material without the provision of a complicated seal arrangement or unless the thrust assemblies are located in a sealed housing.

According to our invention in an automatic slack adjuster of the kind set forth each thrust assembly is guided to slide axially in a bore in a relatively fixed housing.

Angular movement of the thrust members is therefore eliminated which, in turn, reduces or substantially eliminates any tendency for the thrust assemblies to bend and reduces substantially the generation of friction forces which otherwise could impede rotation between the first and second members of each thrust assembly.

Preferably in each thrust assembly the first member comprises a nut and the second member is rotatable in the bore in which it is guided to slide axially.

When installed in a shoe-drum brake a rigid strut is interposed between each second member and the cam and has a rocking engagement at opposite ends in complementary recesses of part-spherical outline in the second member and the cam. The struts can be relatively light in construction thereby reducing to a minimum the inertia of the rocking parts.

Thus the only parts which move angularly are of fixed axial length so that the characteristics of the adjuster remain constant irrespective of the effective lengths of the thrust assemblies.

The screw-threads can be protected easily against the ingress of dirt and other foreign material. For example a simple boot can be provided between each nut and the housing, and the portion of the second member which projects through the nut can be enclosed within a cover which is carried by the nut.

Internal shoe-drum brakes incorporating automatic slack adjusters in accordance with our invention are illustrated in the accompanying drawings in which.

Figure 1:
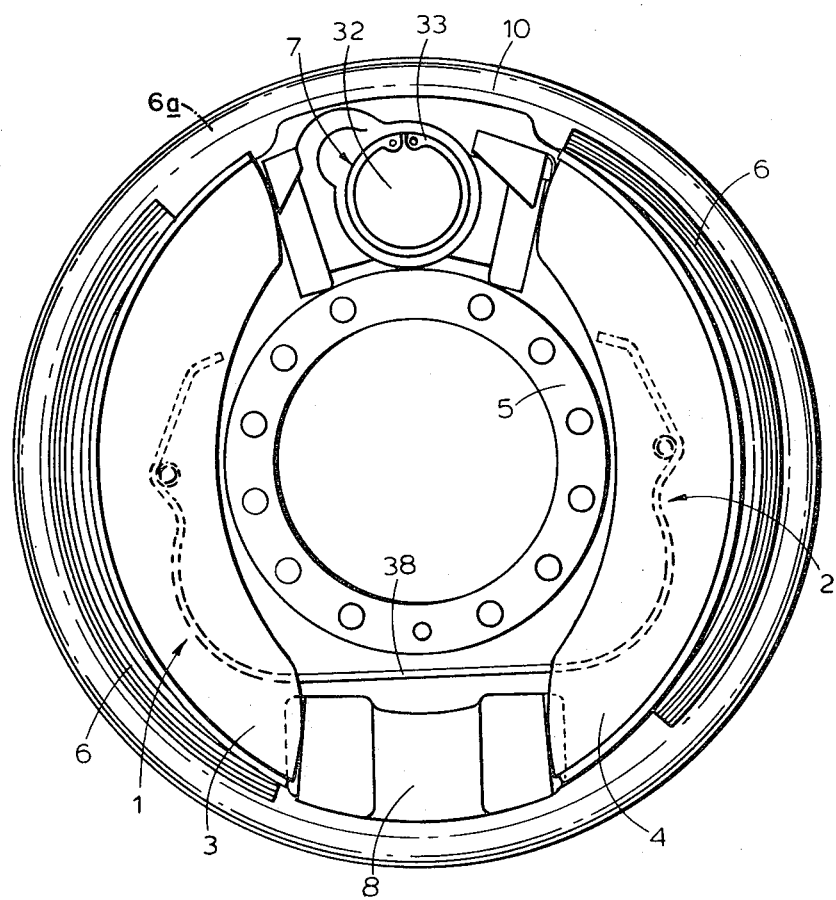
FIG. 1 is a plan of a brake with the drum omitted for clarity.
Figure 2:
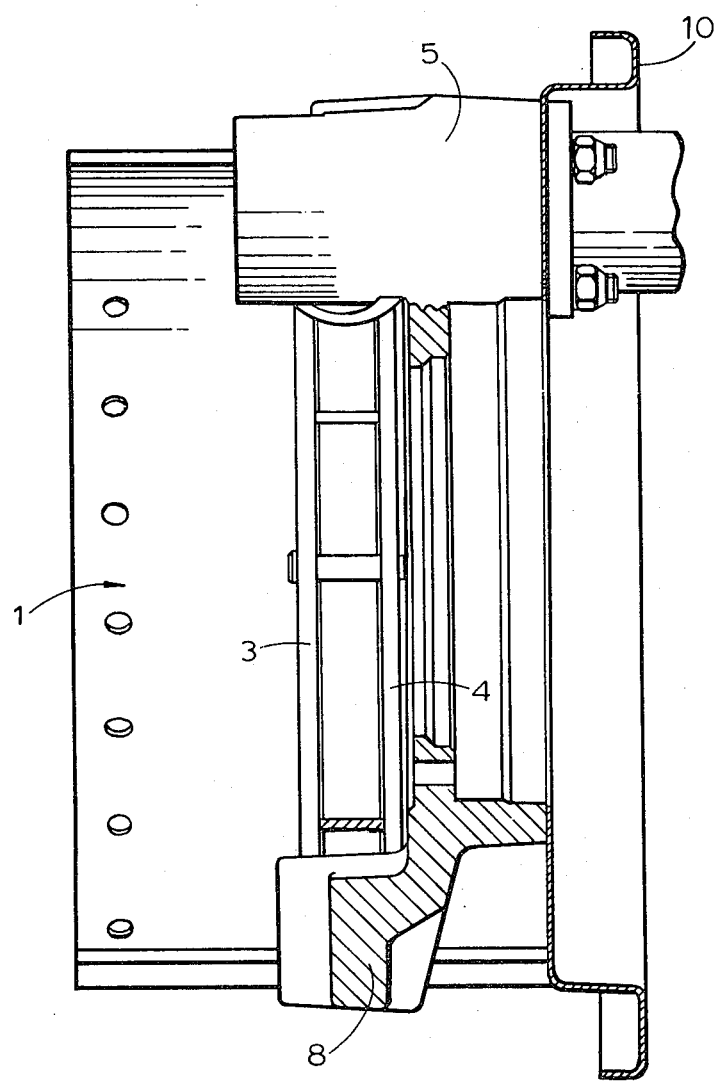
FIG. 2 is a transverse section through a major portion of the brake.
Figure 3:
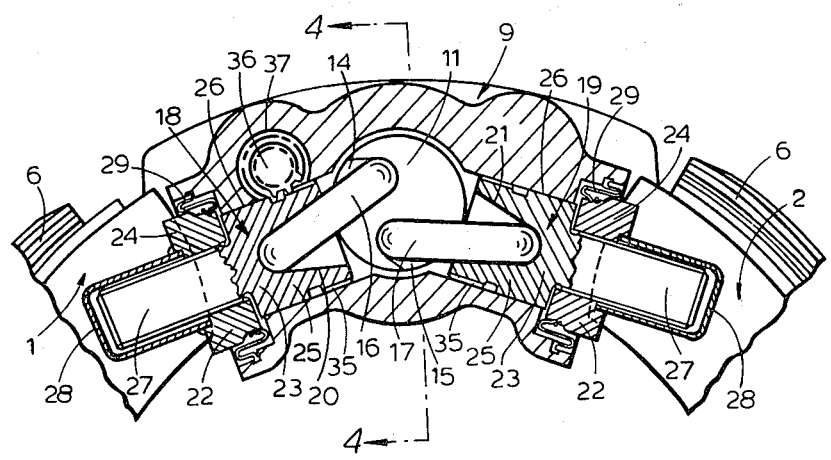
FIG. 3 is a section through the adjuster on an enlarged scale.
Figure 4:
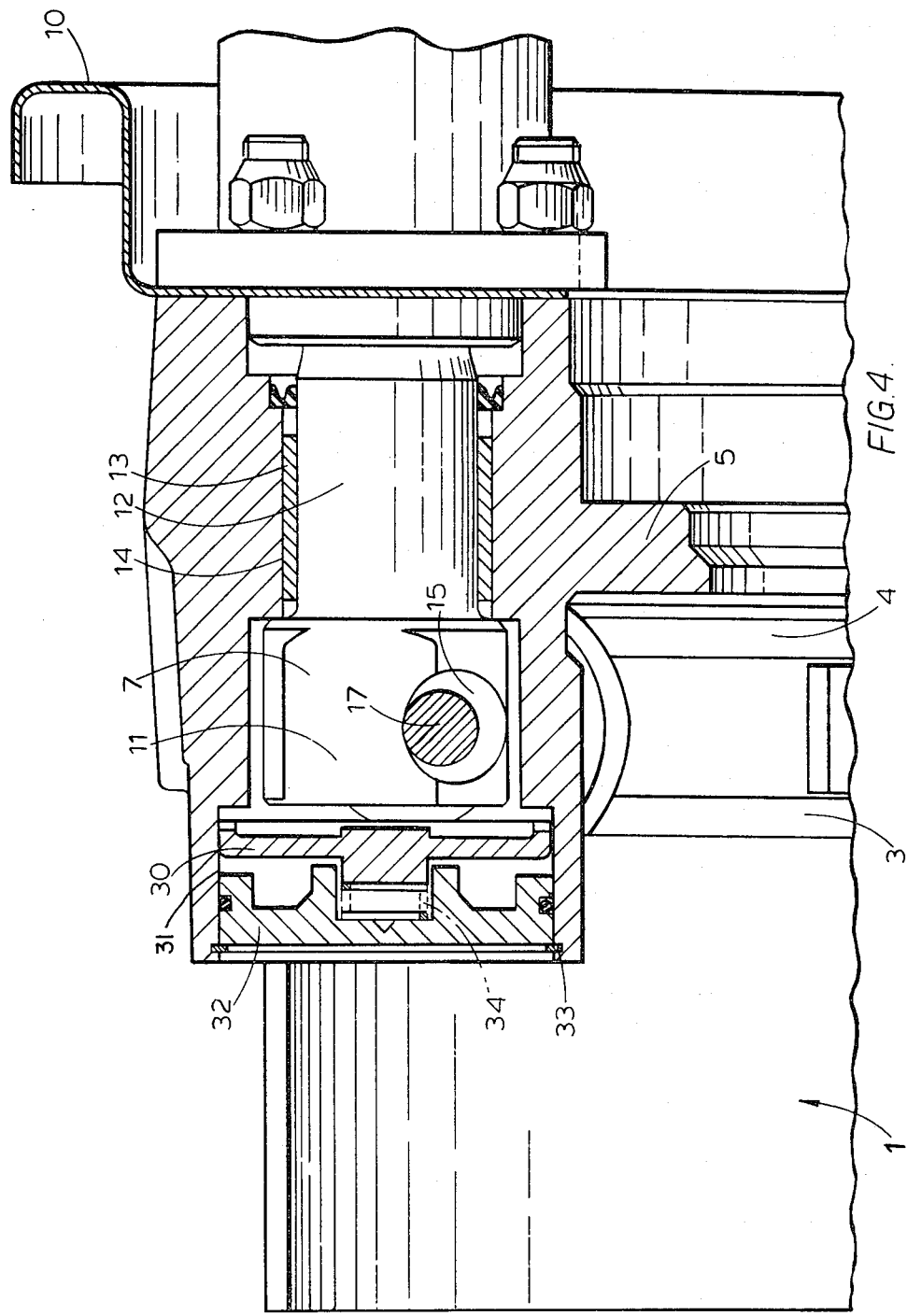
FIG. 4 is a section on the line 4—4 of FIG. 3.

In the internal shoe-drum brake illustrated in FIGS. 1–4 of the drawings a pair of arcuate brake shoes 1,2, each provided with spaced radial webs 3,4, are mounted on a one-piece cast or forged torque plate 5. Each shoe 1,2 carries a friction lining 6 for engagement with a rotatable drum, 6a.

An actuator assembly 7 is located between one adjacent pair of shoe-ends, and the shoe-ends of the other pair abut against a fixed abutment 8 in the form of a rigid block. As illustrated a housing 9 for the actuator assembly 7 and the block 8 both comprise parts of the torque plate 5. A circular dirt shield 10 is mounted on the face of the torque plate 5 which is remote from the shoes 1,2.

The actuator assembly 7 comprises a cam 11 which is carried by, or is integral with, a cam shaft 12 journalled for rotation in a bushing 13 in a bore 14 in the torque plate 5 which is parallel to the axis of the brake. The cam 12 is provided with diametrically opposed part-spherical recesses 14,15 in which are received the part spherical ends of a pair of rigid struts or dollies 16,17 of which the outer ends act on the adjacent shoe-ends through thrust assemblies 18,19 with outer part-spherical ends of the struts 16,17 being received in complementary part-spherical recesses 20,21 in the adjacent ends of the thrust assemblies 18,19.

Upon rotation of the shaft 12 to apply the brake, the struts 16,17 are urged in opposite directions with the struts 16,17 also moving angularly and the ends rocking in the recesses 14,15, 20 and 21. The brake acts as a brake of the one-leading, one-trailing shoe-drum type for both directions of drum rotation.

Each thrust assembly 18,19 forms part of an automatic slack adjuster for automatically maintaining the braking clearances substantially at constant values. Each thrust assembly 18,19 comprises a nut 22 engaging with a respective shoe-end, and a screw-threaded tappet 23 which is screwed through the nut 22. Each nut 22 has a projection 24 which is received between the webs 3,4 of its respective shoe 1,2 to hold the nut 22 against rotation. Each threaded tappet 23 comprises a cylindrical piston part 25 which is guided to slide in a bore 26 in the housing 9, which bore 26 is generally tangential to the axis of the brake, and the piston part 25 has an integral threaded stem 27 of reduced diameter which is screwed through the nut 22, projecting between the flanges 3,4 at its free end. The recesses 20 and 21 are provided in the inner ends of the piston parts 25. Each projecting stem 27 is enclosed within a closure cup 28 of metal or plastics material which is carried by the nut 22, and sealing boots 29 of the concertina type are connected between the nuts 22 and the adjacent ends of the bores 26.

A pinion 30 in the form of a crown wheel is rotatably mounted co-axially with the cam 11 in an enlarged portion 31 of the bore 14 opposite the shaft 12, and the portion 31 is closed by a plug 32 which is held in position by means of a circlip 33. A spring 34 acts between the plug 32 and the crown wheel 30 to urge the crown wheel 30 into mesh with gear teeth 35 on the inner ends of the piston parts 25 so that rotation of one of the tappets 23 is accompanied by a corresponding rotation of the other tappet 23. Thus rotation of one of the tappets 23 to increase the effective length of one thrust assembly, say 18, to compensate for wear of the friction linings 6 causes an equivalent increase in the effective length of the other assembly 19.

Rotation of the tappet 23 of the thrust assembly 18 is accomplished by a pinion 36 which is journalled for rotation in a bore 37 provided in the housing 9 in a position parallel to the axis of the brake, and the pinion 36 is coupled to a relatively stationary member through in one-way drive clutch which operates when adjustment to compensate for wear of the friction linings 6 is required.

Normally a return spring assembly 38 urges the shoes 1, 2 into retracted positions in which the tappets 23 are urged inwardly of their bores 26 until the shaft 12 abuts a rotary stop (not shown) in an air cylinder for rotating the shaft 12.

In the application of the brake when no adjustment is required the thrust members 18 and 19 are urged outwardly and the teeth 35 on the tappet 23 engage with the pinion 36 which tends to rotate relative to the stationary member through the one-way drive clutch and through an initial distance. Upon release of the brake the thrust members 18 and 19 are returned to their initial retracted positions, and the pinion 36 is also retracted in the opposite direction and into its initial position.

When the brake-applying movement is excessive the pinion 36 is rotated through a distance in excess of the said initial distance through the one-way drive, and the one-way drive is operative to hold the pinion 36 in an advanced angular position to which it has been displaced.

Upon retraction of the shoes 1, 2 under the effect of the action of the spring assembly 38, since the pinion 36 is held against rotation by the clutch longitudinal inward movement of the tappet 23, which is in mesh with it, is also accompanied by rotation of the tappet 23 to increase the effective length of the thrust assembly 18. As stated above the crown wheel 30 ensures that rotation of one tappet 23 is accompanied by an equal rotation of the other tappet 23 so that the effective lengths of both thrust assemblies are increased simultaneously and by equal amounts.

In a modification the crown wheel 30 which is co-axial with the cam 11 can be replaced by a toothed wheel carried by the inner end of a radial shaft.

Also the pinion 36 can mesh with the crown wheel 30, or with the toothed wheel in the construction described in the preceding paragraph, rather than with one of the tappets. In such a construction the pinion 36 is rotated to impart rotation of the two tappets 23 when adjustment is required.

Arranging for the bores 26 to be substantially tangential to the axis of the brake provides the tappets 23 with lines of action against the shoe-ends which are correspondingly convergent inwardly. This ensures that the loading on the threads is substantially wholly compressive, and the thrust members 18, 19 are not subjected to any significant degree of bending.

Abutments defined between the ends of the webs 3, 4 at the shoe-ends and the nuts 22 permit the shoe-ends to slide along the nuts 22 substantially in radial directions as the linings 6 wear.

If required our adjuster can be wound back by manual rotation of the pinion 36, without first having to remove the drum.

Figure 7:
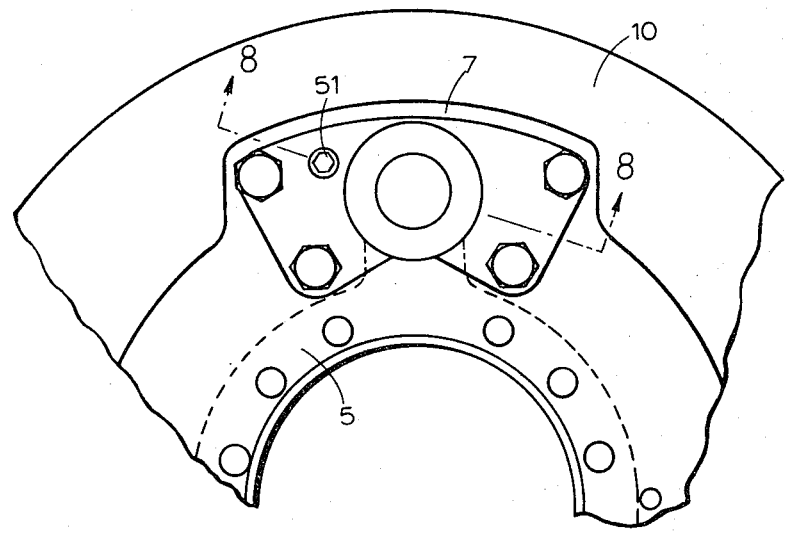
FIG. 7 is a rear plan of a dirt shield for the brake of FIG. 5.
Figure 5:
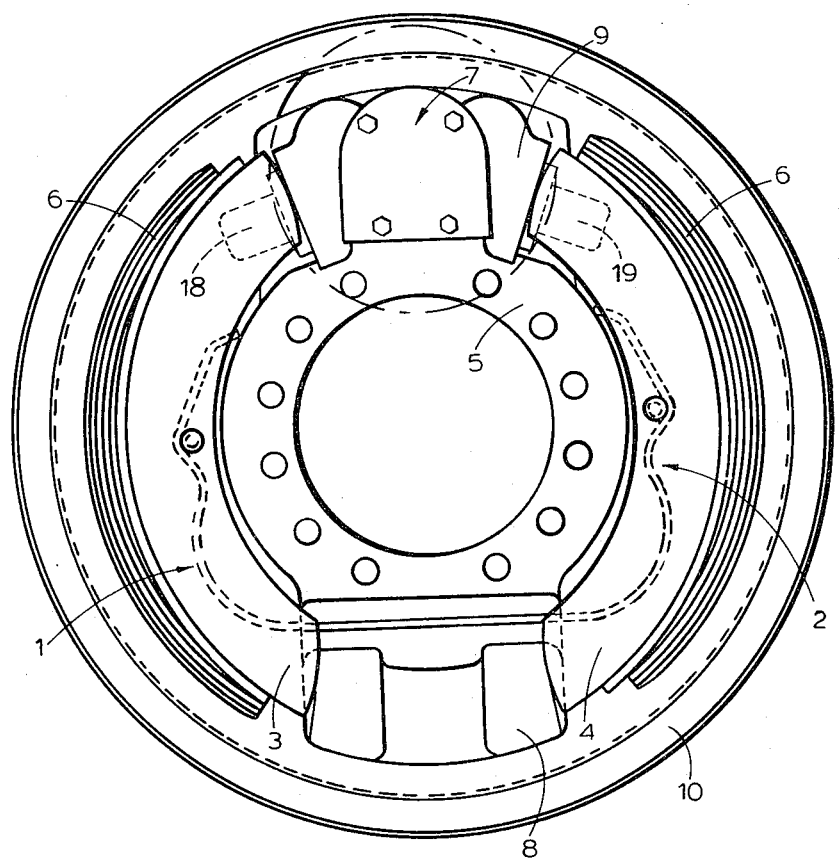
FIG. 5 is a plan of another brake again with the drum omitted for clarity.
Figure 6:
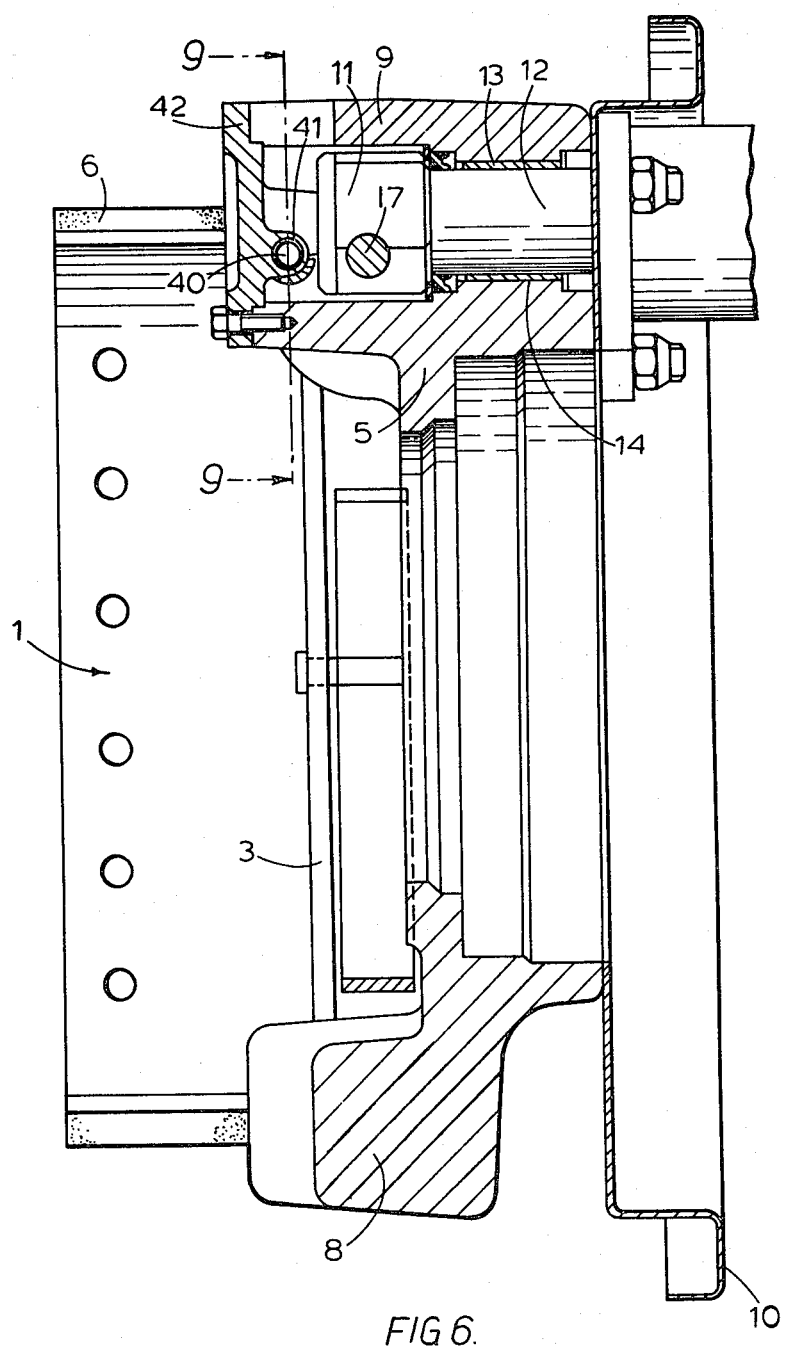
FIG. 6 is a transverse section through a major portion of the brake shown in FIG. 5.
Figure 8:
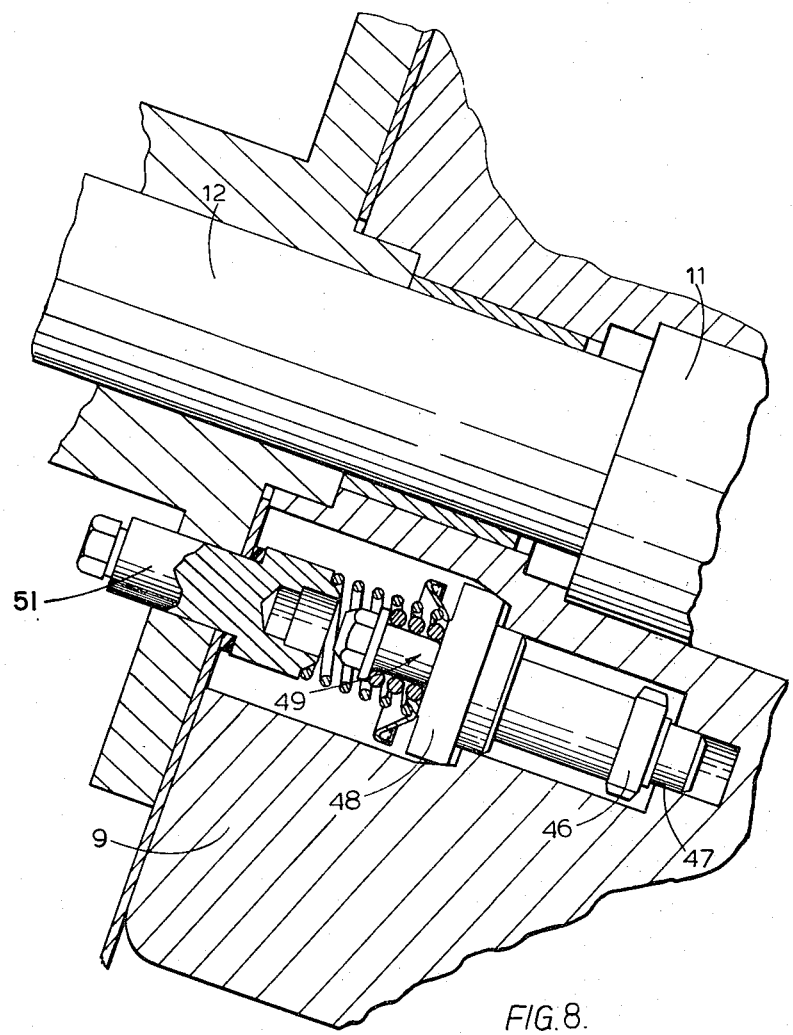
FIG. 8 is a section on the line 8—8 of FIG. 7.
Figure 10:
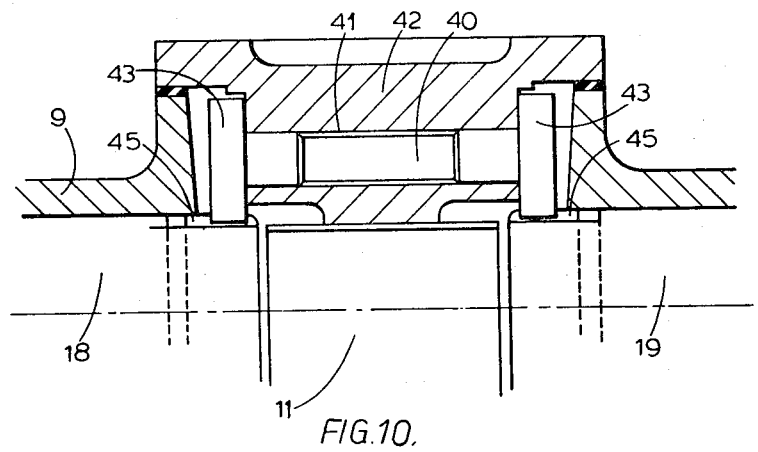
FIG. 10 is a section on the line 10—10 of FIG. 6.
Figure 9:
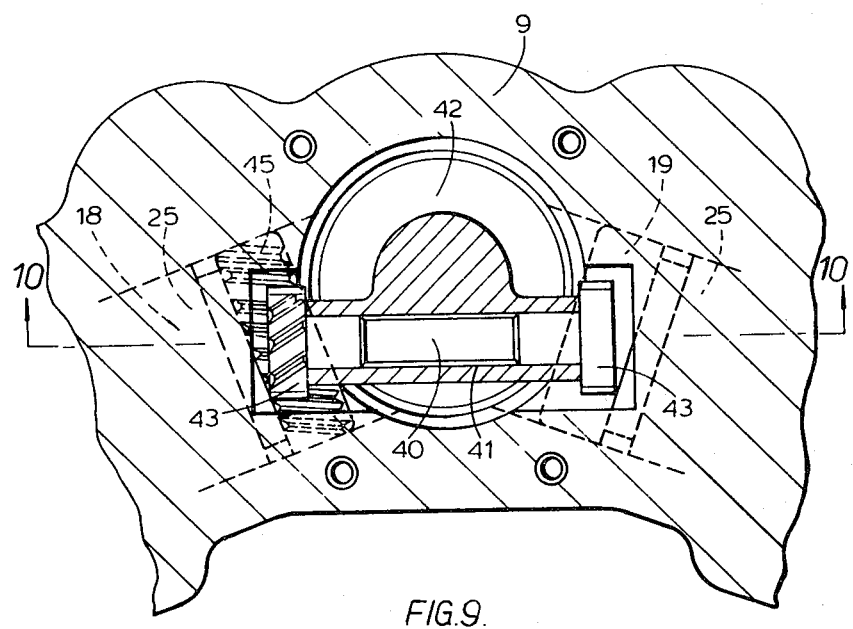
FIG. 9 is a section through the adjuster on an enlarged scale and through the centre line of the shoes.

In the brake illustrated in FIGS. 5–10 of the drawings a shaft 40 is journalled for rotation in a bore 41 in an end cap 42 for closing the end of an enlarged portion of the bore 14 opposite the shaft 12. The bore 41 is normal to the main longitudinal axis of the bore 14 but is spaced radially from the axis of the bore 41 itself. Opposite ends of the shaft 40 which project from opposite ends of the bore 41 carry pinions 43 in constant mesh with gear teeth 45 on the inner ends of the piston parts 25 so that rotation of one of the tappets 23 is accompanied by corresponding rotation of the other tappet 23. Thus rotation of one of the tappets 23 to increase the effective length of one thrust assembly, say 18, to compensate for wear of the friction linings 6 causes an equivalent increase in the effective length of the other assembly 19.

Rotation of the tappet 23 of the thrust assembly 18 is accomplished by a pinion 46 which is journalled for rotation in a bore 47 provided in the housing 9 in a position parallel to the axis of the brake, and the pinion 46 is coupled to a relatively stationary member through in one-way drive clutch 48 to an automatic slack adjuster 49 of known type. The adjuster 49 conveniently forms the subject of U.S. Pat. Nos. 3,882,974 and 3,885,652.

In the application of the brake the tappets 23 are urged outwardly and the arrangement of the teeth 45 on the tappet 23 of the thrust member 18 and on the pinions 33 is such that the shaft 40 is caused to rotate when a normal brake applying movement takes place with the tappets 23 being maintained against rotation. Similar, when the brake is released, the shaft 40 rotates in the opposite direction.

When the brake-applying movement is excessive, the engagement of the pinion 46 with the tappet 23 causes the pinion 46 to rotate against the force in the clutch 48. Upon retraction of the shoes 1, 2 under the effect of the action of the spring assembly 48 the pinion 46 is held against rotation by the clutch 48 so that longitudinal inward movement of the tappet 23, which is in mesh with it, is also accompanied by rotation of the tappet 23 to increase the effective length of the thrust assembly 18. As stated above the assembly of the shaft 40 and the pinions 43 ensures that rotation of one tappet 23 is accompanied by an equivalent rotation of the other tappet 23 so that the effective lengths of both thrust assemblies are increased simultaneously and by corresponding amounts.

When the brake is assembled initially, any back-lash between the teeth 45 on the tappets 23 and the teeth on the pinions 43 will be taken up during the first few brake applications in which the linings 6 bed-in. Thus no means have to be provided to compensate from such back-lash.

The adjuster 49 can be wound back by the engagement of a manually-operable member 51 which is accessable without first having to remove the drum.

The construction and operation of the brake of FIGS. 5-10 is otherwise the same as that of FIGS. 1-4 and corresponding reference numerals have been applied to corresponding parts.

We claim:

1. A vehicle shoe-drum brake of the one-leading, one-trailing shoe-drum simplex type comprising a rotatable drum, a relatively stationary torque-plate, brake shoes mounted on said torque plate and carrying friction linings for engagement with said rotatable drum, an actuating cam disposed between adjacent ends of said shoes, a cam shaft carrying said cam and which is journalled in said torque plate for rotation about a fixed axis to enable said cam to separate said adjacent ends of said shoes, and a slack adjuster, said slack adjuster comprising a housing mounted on said torque plate and fixed relative to said shoes, a pair of thrust assemblies guided to slide axially in bores in said housing, each said thrust assembly being adapted to act between said cam and said end of a respective one of said shoes, and each said thrust assembly comprising first and second interengaged screw-threaded members which are relatively rotatable to increase the effective length of said thrust assembly to compensate for wear of said friction lining of said respective one shoe, a rigid strut interposed between said cam and each said second member and through which said cam acts on said thrust assemblies to separate said adjacent ends of said shoes in response to rotation of said cam shaft, complementary recesses of part-spherical outline in said cam and in said second members and in which opposite ends of said struts have rocking engagements, means for holding each said first member against rotation with respect to said end of said respective shoe, and gear teeth provided on each said second member, a drive mechanism in constant meshing engagement with said gear teeth of both said second members so that both said second members are adapted to rotate together whereby the effective lengths of both said assemblies are increased by equivalent amounts, and means for rotating at least one of said second members when adjustment to compensate for wear is required.

2. A brake as claimed in claim 1, wherein in each thrust assembly said first member comprises a nut and said second member is rotatable in said bore in which said second member is guided to slide axially.

3. A brake as claimed in claim 2, wherein a boot is provided between each said nut and said housing, and a cover carried by said nut encloses a portion of said second member which projects through said nut.

4. A brake as claimed in claim 1, wherein both said second members are provided with gear teeth, and said drive mechanism comprises a pinion in the form of a crown wheel which is journalled for rotation in said housing, a spring acting to urge said crown wheel into meshing engagement with said gear teeth on both said second members at all times.

5. A brake as claimed in claim 1, wherein both said second members are provided with gear teeth, and said drive mechanism comprises a pair of interconnected pinions which are rotatable about an axis normal to said axis about which said cam shaft is rotatable, each said pinion meshing at all times with said gear teeth on a respective one of said second members.

6. A brake as claimed in claim 5, wherein a transverse shaft is journalled for rotation in a transverse bore in said housing, and said pinions are fast with opposite ends of said transverse shaft.

7. A brake as claimed in claim 6, wherein said transverse bore is normal to a main longitudinal bore in said housing in which said cam shaft is adapted to rotate.

8. A brake as claimed in claim 6, wherein the form of said teeth on said two pinions and on said second members is so constructed and arranged that said transverse shaft is rotated in said transverse bore as each said thrust assembly is moved axially in the application of the brake without said first and said second members rotating with respect to each other.

* * * * *